US006874549B1

(12) United States Patent  (10) Patent No.: US 6,874,549 B1
Williams  (45) Date of Patent: Apr. 5, 2005

(54) TRANSPORTABLE OIL DRAIN PAN

(75) Inventor: Danny Williams, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/865,164

(22) Filed: Jun. 10, 2004

(51) Int. Cl.[7] .............................................. B65B 1/04
(52) U.S. Cl. ........................... 141/98; 141/65; 184/106; 220/573
(58) Field of Search ...................... 141/98, 65; 184/1.5, 184/106; 220/573

(56) References Cited

U.S. PATENT DOCUMENTS 5,503,246 A   4/1996 Raboin et al.
D399,224 S * 10/1998 Maynard .................... D15/150

OTHER PUBLICATIONS

OTC Tools, Product No. 5076, Transfer Tanker, www.otc-tools.com/frames–catalog.php3, Mar. 11, 2004.
Todd Enterprises, Product No. 2400–34, Low–Boy 17 Gallon Oil Drain, www.toddusa.com/itod01.html, Mar. 11, 2004.
John Dow Industries, Product No. JDI–LP4, 17–Gallon Low–Profile Portable Oil Drain with Optional Self–Evac Kit (Product No. JDI–EK), www.johndow.com/pageslp4.html, Mar. 11, 2004.
John Dow Industries, Product No. JDI–LP5, 25–Gallon Low–Profile Portable Oil Drain with Electric Evacuation Pump, www/johndow.com/pageslp5.html, Mar. 11, 2004.
John Dow Industries, Product No. JDI–AF10E, 10 Gallon Low–Profile Portable Oil Drain with Electric Evacuation Pump, www.johndow.com/pages/jdiaf10e.html, Mar. 11, 2004.
Chilton, Chilton Catalog, Model No. PT–50, Polyethylene Truck Recovery Drain Pan and Storage Container, no date.

* cited by examiner

Primary Examiner—Steven O. Douglas
(74) Attorney, Agent, or Firm—Banner & Witcoff, Ltd.

(57) ABSTRACT

An oil drain pan comprises a unitary, molded plastic container with a bottom panel, a lateral side wall panel and a top panel with a large opening therein. A wire handle is inserted into a peripheral slot in the top panel. Casters are affixed to the side panel intermediate the top and bottom panel so that the container is elevated appropriately but maintains a minimum low profile. The container is symmetrical about a longitudinal axis and further includes a pour spout at the front end thereof.

11 Claims, 5 Drawing Sheets

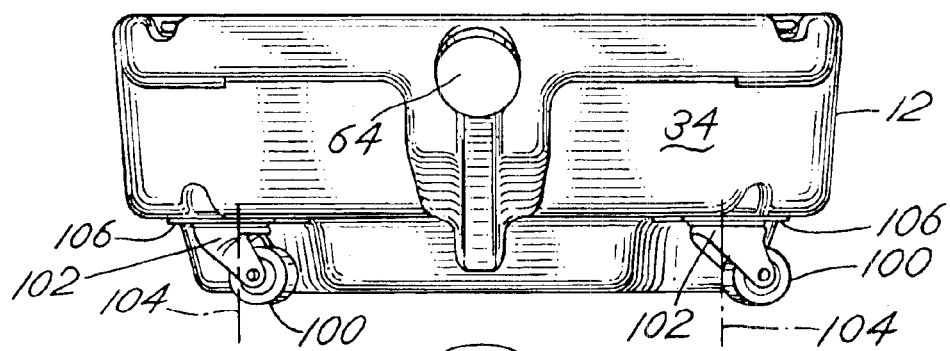
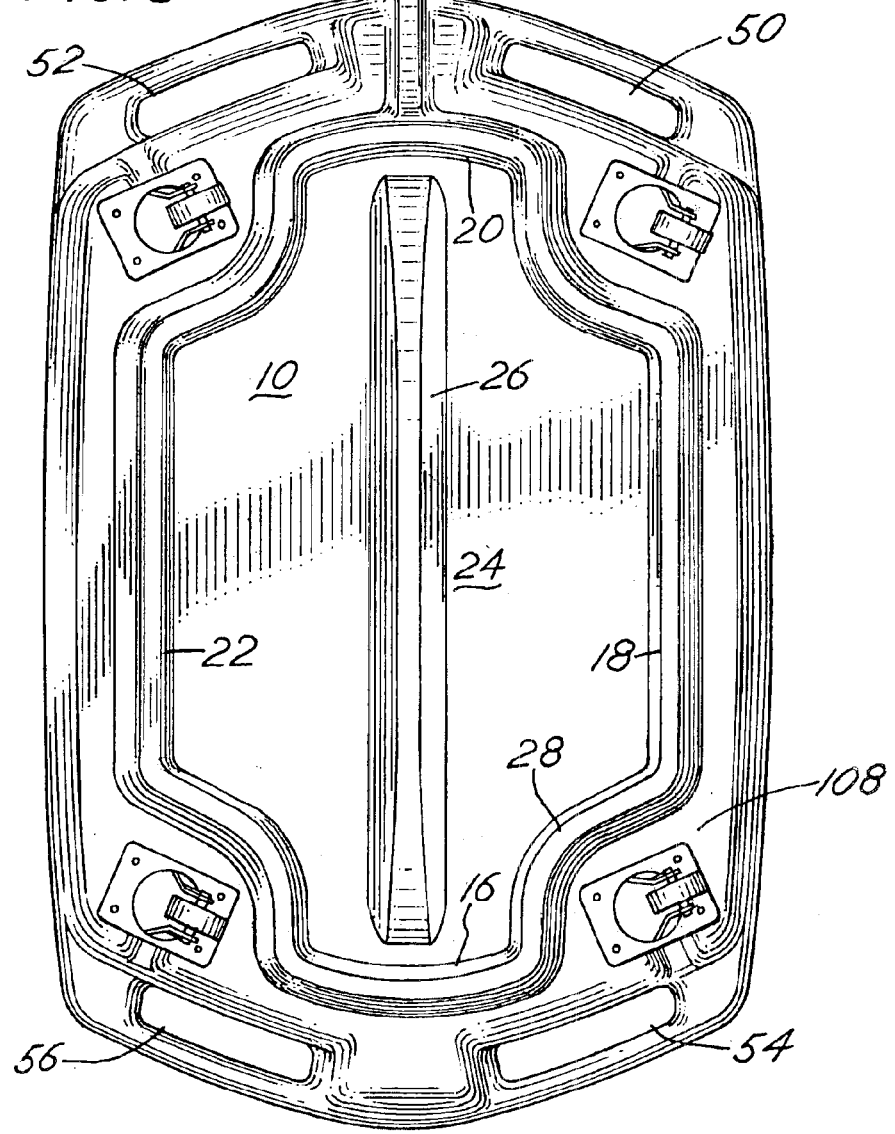

TRANSPORTABLE OIL DRAIN PAN

BACKGROUND OF THE INVENTION

In a principal aspect, the present invention relates to a container or drain pan designed for placement beneath a vehicle for the collection of fluid, such as oil, drained from a crankcase, and for safe transport of that collected fluid.

Collecting fluids from a motor vehicle so that the fluid may be replaced is a common task performed by a mechanic or vehicle service person. A protocol for undertaking such a task, the vehicle is elevated upon a rack and an oil or fluid collection funnel assembly is positioned beneath the vehicle so that when the drain plug is removed, fluid will flow into the funnel collection device. However, many vehicles are so large and so heavy that elevating them on a rack becomes somewhat impractical. Thus, there has developed a protocol of removing the drain plug from beneath the standing vehicle while at the same time positioning a low profile collection pan under the vehicle so that fluid will flow or drain into the pan. Various prior art devices have been developed for such an undertaking including the device illustrated in U.S. Pat. No. 5,503,246 issued Apr. 2, 1996 for a "Crankcase Oil Drain Pan". Other such devices in the marketplace include an oil pan collection device offered by OTC Tools as OTC Product No. 5076 Transfer Tanker. The OTC device comprises a collection pan mounted on casters. The pan is generally rectangular and includes a wagon style handle at the front end for transport of the device. Another similar product is offered by Todd Enterprises of Cranston, R.I., and is identified as Todd "Low-Boy 17 Gallon Oil Drain", Product No. 2400-34. John Dow Industries offers a similar product identified as a "17 Gallon Low-Profile Portable Oil Drain", Product No. JDI-LP4. John Dow Industries offers a larger version of a similar product identified as "25 Gallon Low-Profile Portable Oil Drain", Product No. JDI-LP5. Finally, John Dow Industries offers a smaller capacity device identified as "10 Gallon Low-Profile Portable Oil Drain", Product No. JDI-AF10E.

Such prior art devices have a number of features in common. They are generally portable and move on rollers or casters so that they may be easily positioned beneath a vehicle such as a truck. Typically, they include some type of handle or mechanism to facilitate transport or movement of the device. Typically, the products include a means to effect draining of the product once the pan or container is filled with fluid collected from the vehicle. Finally, such products typically have a low profile so that they may be easily positioned or guided beneath a vehicle, particularly a large vehicle, such as a truck.

While such devices are useful, there has remained the need for an inexpensive, yet rugged and reliable drain pan construction which is portable and can be easily filled and then drained.

SUMMARY OF THE INVENTION

Briefly, the present invention comprises a unitary, molded plastic container with a retractable handle. The container includes a bottom panel which has a generally cruciform shape, a lateral, circumferential side panel extending upwardly from the bottom panel and a top panel which includes a circumferential, inwardly, extending edge that defines a large opening in the center of the container for receipt of collected fluid. The center opening comprises approximately 40% or more of the area bounded or defined by the top panel. Thus, a large opening is provided for receipt of fluid collected from beneath the vehicle thereby enabling easy alignment of the drain pan opening with a drain plug outlet. The drain pan construction further includes fully rotatable casters positioned in a rectangular pattern in recessed sections of the lateral side panel. The side panel is also configured with hand grip openings at the front and rear end of the drain pan. The top panel includes a peripheral slot into which a wire handle may be positioned. The wire handle is U-shaped and includes spaced, generally parallel legs inserted into bushings molded into the top panel. A hand opening is also provided in the top side panel to enable gripping a crown of the wire handle which connects the spaced legs.

Thus, it is an object of the invention to provide an improved drain pan construction.

It is a further object of the invention to provide an improved drain pan construction comprised of a molded plastic container with a wire rod handle for easy transport thereof on rotatable casters.

Another object of the invention is to provide a rugged, yet inexpensive drain pan construction.

A further object of the invention is to provide a drain pan construction comprised of an open top panel, a peripheral or lateral side panel connected to a cruciform shaped bottom panel wherein separate, rotatable casters are positioned intermediate the legs of the cruciform bottom panel.

A further object of the invention is to provide a drain pan construction which has a low profile, which includes peripheral hand grips and which may be easily emptied once the container or drain pan is filled with liquid.

Another object of the invention is to provide a drain pan construction having a pour spout to facilitate emptying of the drain pan once it is filled.

These and other objects, advantages and features of the invention will be set forth in the detailed description which follows.

BRIEF DESCRIPTION OF THE DRAWING

In the detailed description of the invention, reference will be made to the drawing comprised of the following figures:

FIG. 3 is a side elevation of the drain pan of FIG. 1;

FIG. 4 is a front end view of the drain pan of FIG. 1;

FIG. 6 is a bottom plan view of the drain pan of FIG. 1;

DESCRIPTION OF THE PREFERRED EMBODIMENT

Figure 1:
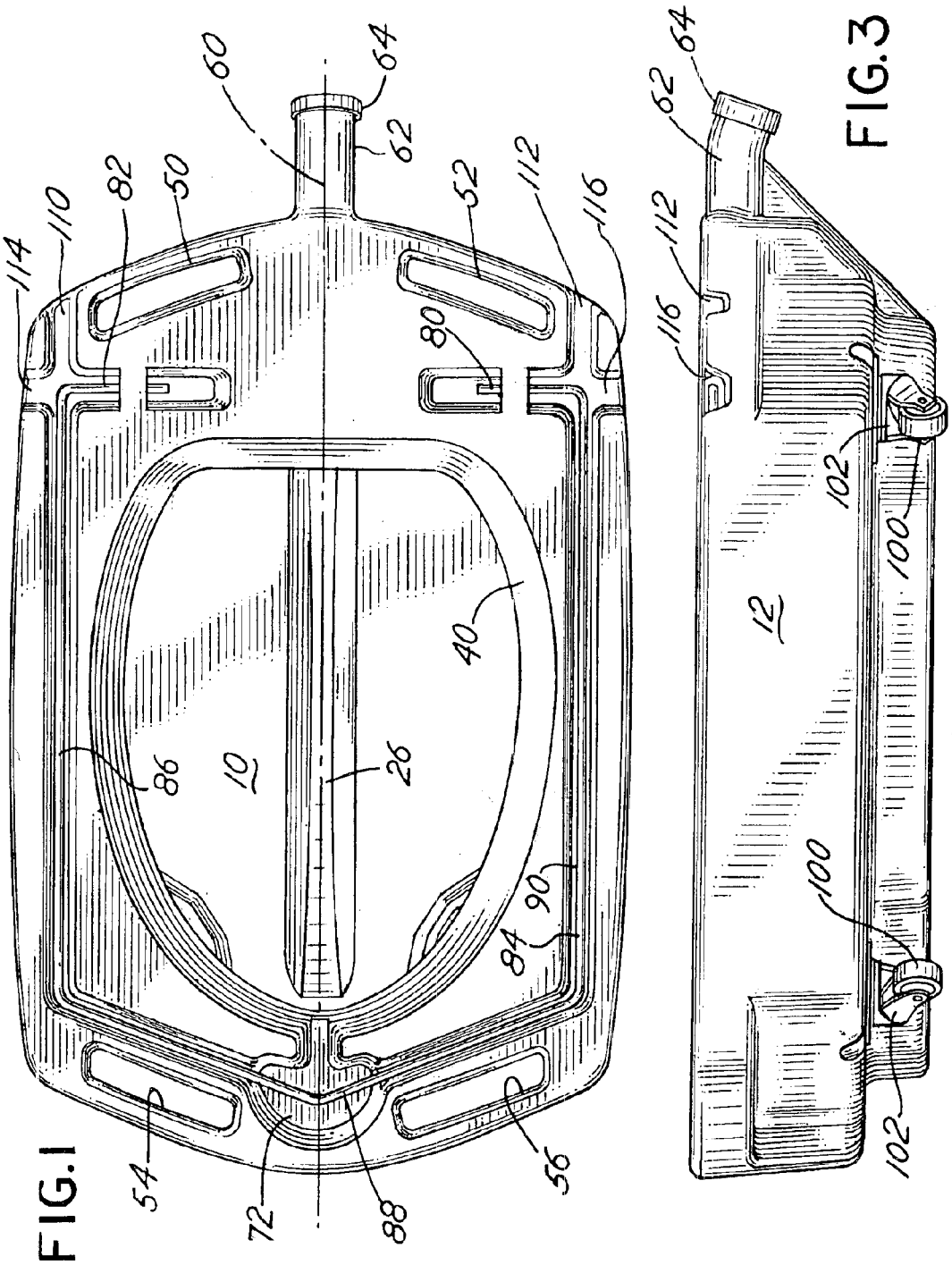
FIG. 1 is a to plan view of the drain pan construction of the invention.

Referring to the figures, the drain pan of the invention includes a generally planar, flat, bottom panel 10, a circumferential, lateral side panel 12 and a generally flat, planar top panel 14. The container is unitary and preferably made from a molded plastic material such as polyethylene. The bottom panel 10, as illustrated in FIG. 6, has a generally cruciform shape comprised of four legs 16, 18, 20, 22 which are arranged at right angles to form a cross with four legs 16, 18, 20, 22 connected at a center portion 24. The bottom panel 10 thus forms the bottom of the pan or container. A longitudinal rib 26 extending axially along axis 60 from the front to the back of the bottom panel 10 is provided to provide structural integrity. The bottom panel 10 also includes a circumferential rib 28 formed to further enhance the structural integrity of the bottom panel 10 as well as the container itself.

Extending generally vertically upwardly from the bottom panel 10 is the side panel 12. The side panel 12 is generally rectangular in shape but is configured to define recess sections to permit the inclusion of casters as described hereinafter and to provide for hand holds described hereinafter. Thus, the side panel 12 includes a first lateral side 30 and a spaced second lateral side 32 joined by a front side 34 and a back side 36 to define thereby an enclosure. The lateral side panel 12 is integrally molded into and connected with the bottom panel 10 and the top panel 14. The top panel 14 includes a generally center opening defined by a circumferential rim 40. The opening defined by the rim 40 preferably includes at least about 40% or more of the top surface area defined by the circumference of the top panel 14. The rim 40 is formed with an inwardly and downwardly surface to define a funnel shape leading to the interior of the drain pan or container of the invention. This facilitates direction of movement of fluid drained from a motor vehicle, for example.

The lateral side panel 12 further includes molded hand holds 50, 52, 54, 56. The hand holds 50, 52 are associated with the front section or side 34 of the side wall panel 12. The hand holds 54, 56 are associated with the backside section or side 36 of the side wall 12. The handles 50, 52, as well as the handles 54 and 56, are arranged symmetrically about center line axis 60 of the container. This symmetry facilitates the ease of use and access to the container. A spout 62 is molded into the lateral side panel 12 and extends axially from the front wall section 34 thereof. The spout 62 connects from the interior of the container and includes a cap 64 which may be opened to permit draining of the contents of the container. Note that the spout 62 extends axially forward along the axis 60. It extends outwardly and downwardly from the juncture of the side panel 12 and the top panel 14. Thus, the hand holds 54 and 56 may, for example, be gripped to elevate the container and tip the container to direct fluid through the open spout 62.

Figure 2:
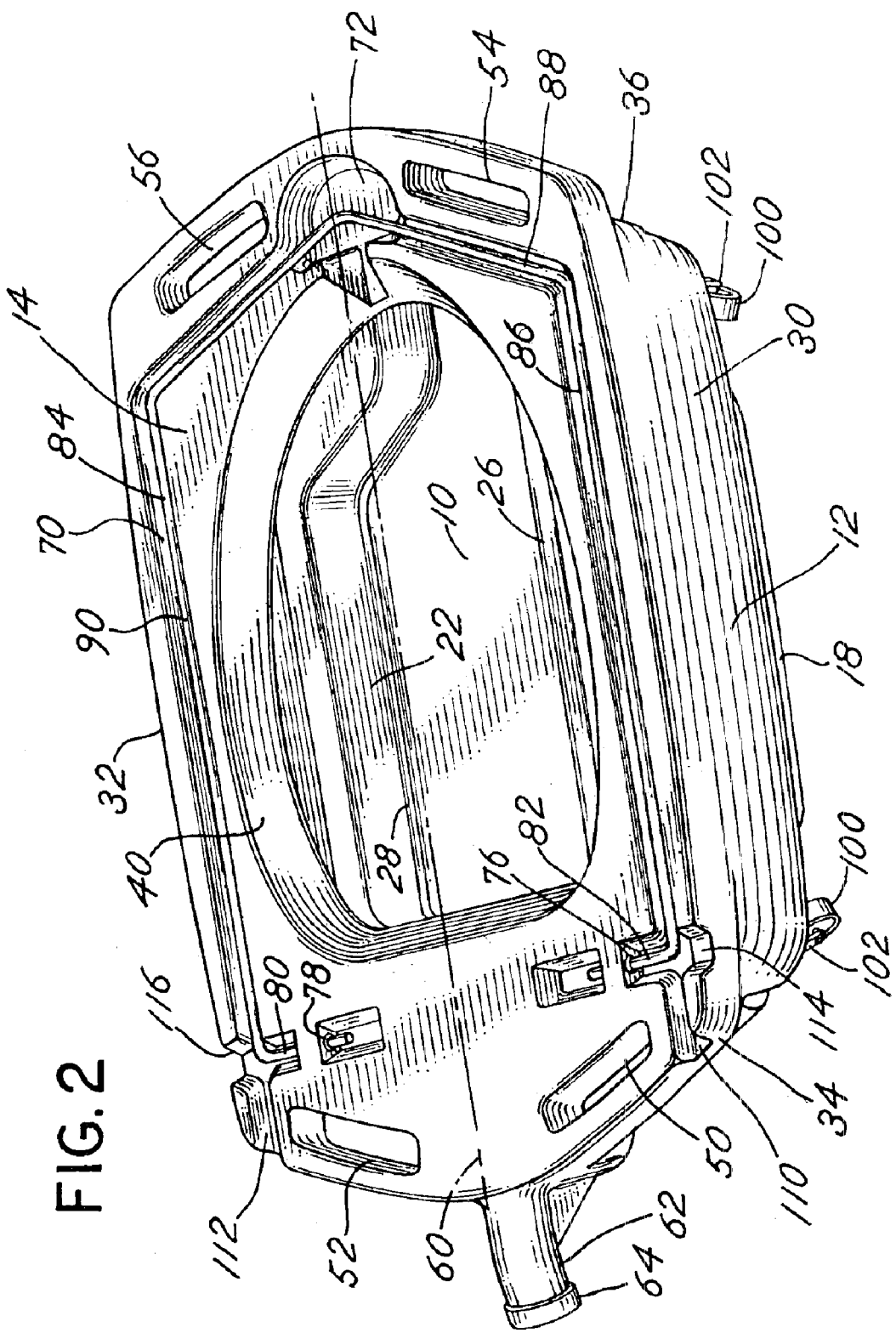
FIG. 2 is an isometric view of the drain pan of FIG. 1.
Figure 5:
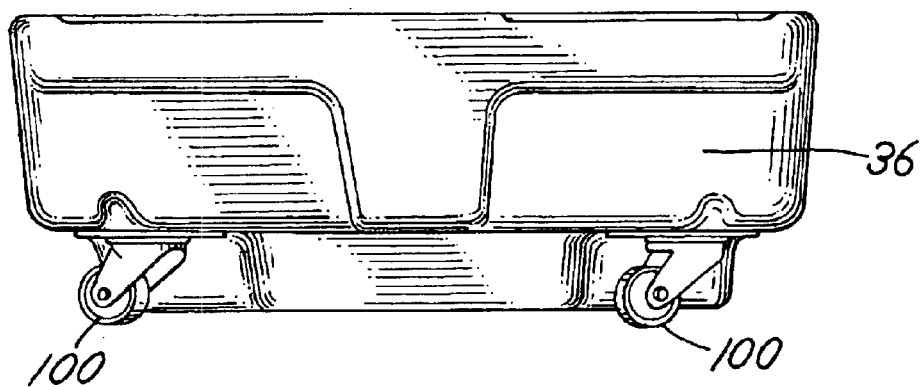
FIG. 5 is a back side or rear end view of the drain pan of FIG. 1.
Figure 8:
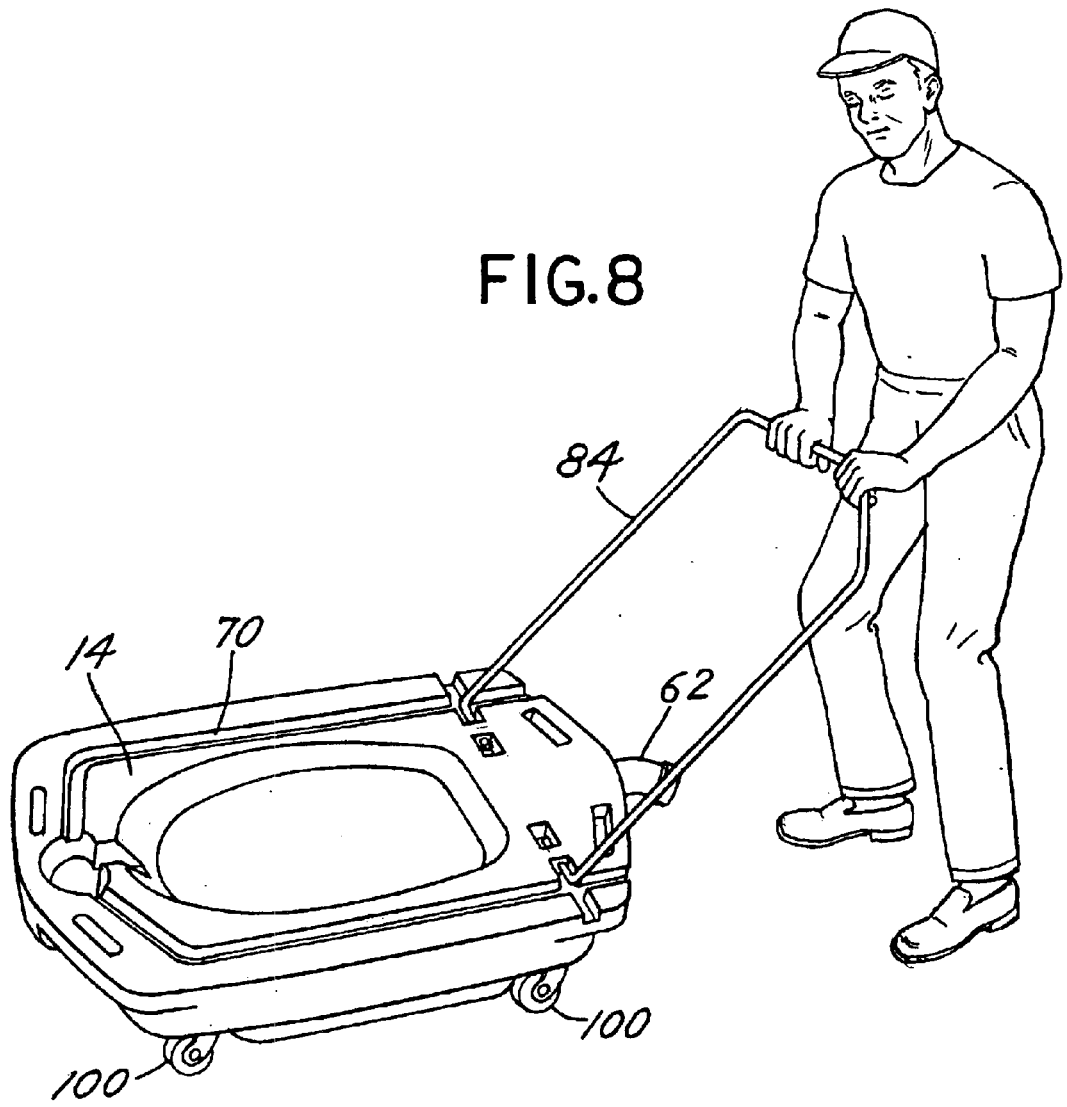
FIG. 8 is an isometric view of the drain pan of the invention as it is utilized and positioned by a workman or mechanic.
Figure 7:
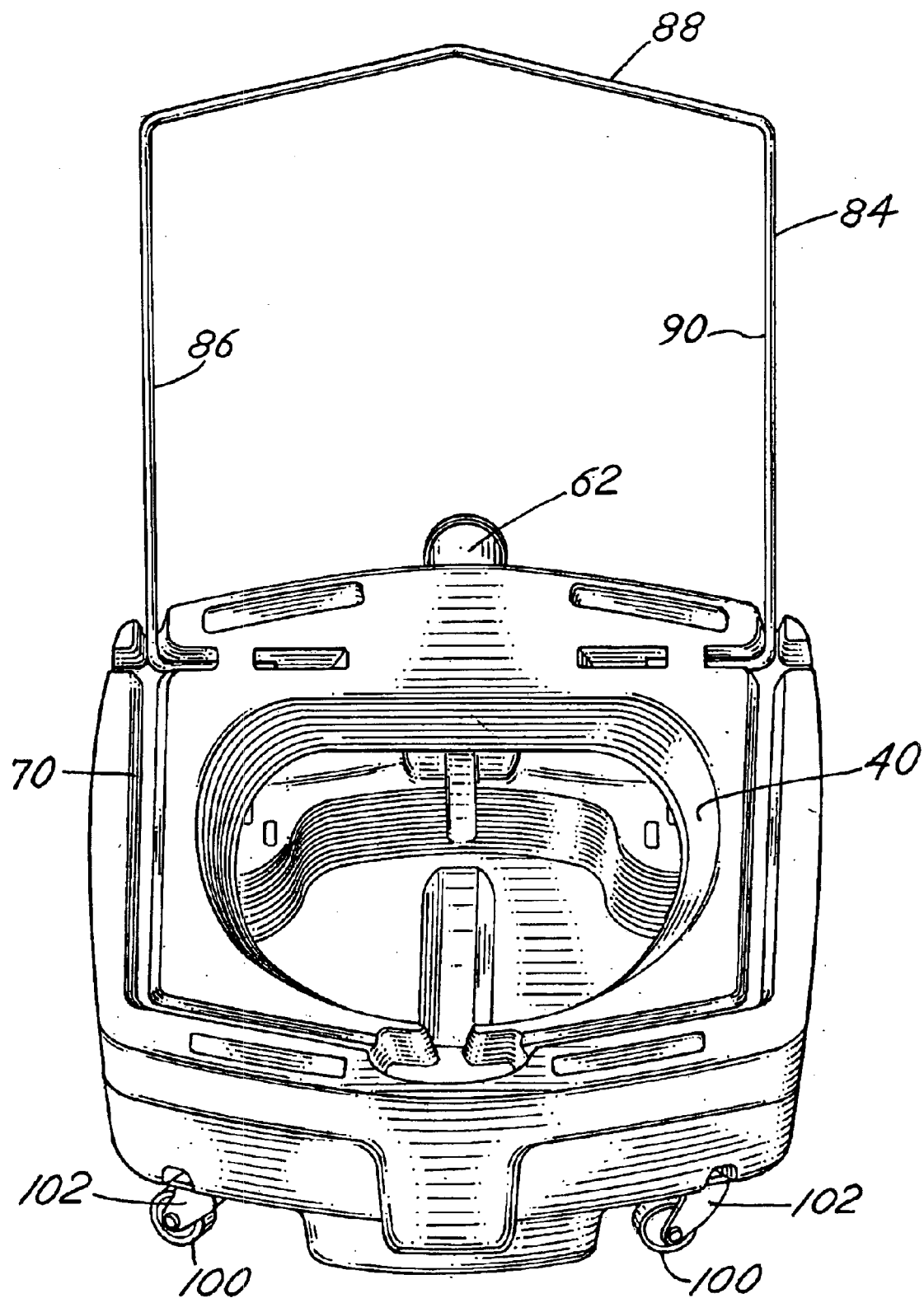
FIG. 7 is an isometric view of the drain pan of FIG. 1 as viewed from the back or rear side wherein the handle is depicted in an elevated position.

The top side panel 14 includes a partially circumferential groove or slot 70. The slot 70 extends along the lateral side section 30, backside section 36 and lateral side section 32. A molded hand well 72 is formed along the axis 60 at the back wall section 36 of the top wall 14. Adjacent the front wall section 34, but molded into the top wall 14 are first and second bushings 76 and 78 which are adapted to receive L-shaped extensions 80 and 82 associated with wire rod handle 84. The wire rod handle 84 thus includes a first leg 86, connecting crown 88, and a second leg 90 to form the U-shaped handle 84. The U-shaped handle 84 may thus pivot on extensions 80, 82 in the bushings 76 and 78 between the position illustrated, for example, in FIG. 2 and the position, for example, illustrated in FIG. 8. In this manner, the filled container or the empty container may be transported easily.

FIGS. 3, 4, 5 and 6 illustrate in greater detail the arrangement of the fully rotatable casters 102 that are incorporated with the drain pan or container of the invention. The casters 102 thus each include a rotatable wheel, such as wheel 100.

The caster 102 pivots fully about a vertical caster axis 104. A mounting plate 106 is provided for attaching the caster 102 to a recessed mounting portion 108 of the lateral side wall panel 12 adjacent each of the corners of the generally rectangular container. Thus, there are four casters 102, one situated in each of the four corners of the drain pan and generally in a rectangular pattern at equally spaced distance from the axis 60. The casters 102 are positioned so that the bottoms of each of the wheels 100 are generally co-planar and extend slightly below the bottom panel 10. The casters 102 are thus positioned between the cruciform arms or extension legs 16, 18, 20, 22 of the bottom panel 10 and positioned in a manner which enables them to rotate fully yet provide superior balance to the container. Also, since the casters 102 are inboard of the lateral side panel 12, they are protected from engaging or bumping into elements which otherwise might restrict the movement of the drain pan or container.

It should be noted that the slot 70 into which the handle 84 is fitted has a series of slot extensions. For example, the slot 70 includes an extension 110 which enables the handle 84 and, more particularly, the leg 86 to fit therein when the handle 84 is rotated from the position in FIG. 1 to a fully opened position. A similar slot 112 is provided for cooperation with the leg 90 associated with the handle. Further, lateral slot extension 114 and slot extension 116 are provided to facilitate assembly and disassembly of the handle 84 from the container. The slots 114 and 116 enable the L-shaped leg extensions 80, 82 to be fitted into or removed from the bushings 76, 78 when the handle 84 is maintained in the vertical position relative to the top side panel 14.

The handle 84 itself which includes first and second spaced lateral side legs 86, 90 and a connecting crown 88 is designed to fit into the slot 70 and not interfere with the space or opening defined by the rim 40. The handle 84 thus, when retained in the slot 70, provides a reinforcing feature associated with the drain pan yet and is also easily maintained in a very low profile within the top panel 14 of the drain pan or container.

As mentioned previously, the center line axis 60 constitutes an axis of symmetry in the longitudinal direction for the drain pan or container. This facilitates the ease of use of the drain pan or container and provides for improved balance in its use and movement.

It is possible to vary the elements or features of the invention without departing from the spirit and scope thereof. The invention is to be therefore limited only by the following claims and equivalents thereof.

What is claimed is:

1. A drain pan comprising, in combination:
   a unitary, molded plastic container including a bottom panel,
   a circumferential lateral side panel extending upwardly from the bottom panel,
   a generally circumferential top side panel extending radially inwardly from the lateral side panel and defining a central opening to the container, said opening comprising at least about 40% of the area defined by the lateral side panel;
   said bottom panel including at least three rotatable casters, each caster separately affixed to the side panel on a base surface in a caster recess formed in said side panel whereby the bottom panel is spaced downwardly from the base surfaces of said caster recesses;
   said casters supporting the container for movement,
   said top side panel including a peripheral recess slot, and a handle pivotally attached to the top side panel and pivotal between a position totally in the recess slot and a position at least in part outside of the slot for transport of the pan.

2. The pan of claim 1 wherein the handle is a U-shaped wire rod having spaced legs connected by a crown, said legs each fitted into bushing passages in the top side panel slot.

3. The pan of claim 2 further including a hand grip recess in the side panel for receipt of at least part of the crown.

4. The pan of claim 1 including four casters, said casters positioned to define a rectangular pattern.

5. The pan of claim 1 wherein the lateral side panel includes a pour spout.

6. The pan of claim 1 wherein the lateral side panel includes a front side section, a back side section and first and second, spaced lateral side sections connecting the front side section and back side section, said top side panel including a U-shaped, wire rod handle pivotally mounted in a slot formed in the top side panel, said handle including first and second spaced legs pivotally connected to the top side panel adjacent the front side section of the lateral side panel and a crown adjacent the back side section of the lateral side panel, when the handle is positioned in the slot; and a pour spout in the front side section of the side panel substantially midway between the first and second legs; said pour spout including a closure cap.

7. The panel of claim 6 wherein said pour spout extends outwardly and downwardly from the side panel at the juncture of the lateral side panel and top side panel.

8. The pan of claim 1 or claim 6 further including at least one molded handle in the side panel.

9. The pan of claim 6 including four handles molded in the side panel with two of said handles molded in the front section and two of said handles molded in the back section.

10. The pan of claim 1 or claim 6 wherein the bottom panel has a cruciform configuration.

11. The pan of claim 6 wherein the bottom panel has a cruciform configuration having four extensions from a center portion and wherein a caster is positioned intermediate each adjacent pair of the cruciform extensions.

* * * * *